US012045357B2

(12) United States Patent
Shaik et al.

(10) Patent No.: US 12,045,357 B2
(45) Date of Patent: *Jul. 23, 2024

(54) SYSTEM FOR DESIGNING AND VALIDATING FINE GRAINED FRAUD DETECTION RULES

(71) Applicant: Visa International Service Association, San Francisco, CA (US)

(72) Inventors: Juharasha Shaik, Fremont, CA (US); Durga Kala, Cupertino, CA (US); Gajanan Chinchwadkar, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,069

(22) Filed: May 10, 2023

(65) Prior Publication Data

US 2023/0274009 A1    Aug. 31, 2023

Related U.S. Application Data

(63) Continuation of application No. 17/283,005, filed as application No. PCT/US2018/055039 on Oct. 9, 2018, now Pat. No. 11,714,913.

(51) Int. Cl.
*G06N 3/08*      (2023.01)
*G06F 9/50*      (2006.01)
(Continued)

(52) U.S. Cl.
CPC .......... *G06F 21/604* (2013.01); *G06F 9/5027* (2013.01); *G06F 18/213* (2023.01);
(Continued)

(58) Field of Classification Search
CPC .......... G06N 3/045; G06N 3/08; G06F 9/466
See application file for complete search history.

(56) References Cited

U.S. PATENT DOCUMENTS 5,819,226 A    10/1998    Gopinathan et al.
6,243,696 B1    6/2001    Keeler et al.
(Continued)

FOREIGN PATENT DOCUMENTS

CN    106803092 A    6/2017
WO    2016077206 A1    5/2016

OTHER PUBLICATIONS

Patidar R, Sharma L. Credit card fraud detection using neural network. International Journal of Soft Computing and Engineering (IJSCE). Jun. 2011;1(32-38). (Year: 2011).*

(Continued)

*Primary Examiner* — Oluwatosin Alabi
(74) *Attorney, Agent, or Firm* — Kilpatrick Townsend & Stockton LLP

(57) ABSTRACT

A method includes receiving historical interaction data, which includes a plurality of historical interactions. Each historical interaction is associated with a plurality of data fields. The method includes assigning a plurality of weights to the plurality of data fields, generating a neural network using the plurality of weights and the plurality of data fields, identifying a first plurality of feature indicators indicative of a first class, the first class being different from a second class; receiving a second plurality of feature indicators derived from data relating to compromised accounts, updating, a probability distribution component using the first plurality of feature indicators and the second plurality of feature indicators, and receiving current data for an interaction. The method also includes applying the probability (Continued)

distribution component to the current data, and scoring the interaction using the probability distribution component.

20 Claims, 6 Drawing Sheets

(51) Int. Cl.
| | |
|---|---|
| *G06F 18/213* | (2023.01) |
| *G06F 18/214* | (2023.01) |
| *G06F 21/60* | (2013.01) |
| *G06N 3/045* | (2023.01) |
| *G06F 9/46* | (2006.01) |

(52) U.S. Cl.
CPC ........... *G06F 18/214* (2023.01); *G06N 3/045* (2023.01); *G06N 3/08* (2013.01); *G06F 9/466* (2013.01)

(56) References Cited

U.S. PATENT DOCUMENTS

| | | | |
|---|---|---|---|
| 7,721,336 B1* | 5/2010 | Adjaoute | G06Q 20/4016 379/189 |
| 11,062,002 B2 | 7/2021 | Telford-reed et al. | |
| 2002/0133721 A1 | 9/2002 | Adjaoute et al. | |
| 2003/0212691 A1* | 11/2003 | Kuntala | G06N 7/01 |
| 2004/0225627 A1 | 11/2004 | Botros et al. | |
| 2005/0149455 A1 | 7/2005 | Bruesewitz et al. | |
| 2007/0100724 A1* | 5/2007 | Hollas | G06Q 40/00 705/36 R |
| 2009/0018940 A1 | 1/2009 | Wang et al. | |
| 2009/0025084 A1 | 1/2009 | Siourthas et al. | |
| 2011/0125687 A1 | 5/2011 | Al-Duwaish et al. | |
| 2012/0054184 A1* | 3/2012 | Masud | G06F 16/285 707/E17.091 |
| 2012/0284213 A1* | 11/2012 | Lin | G06N 3/08 714/E11.02 |
| 2013/0304571 A1* | 11/2013 | Swinson | G06Q 30/0277 705/14.54 |
| 2016/0203490 A1 | 7/2016 | Gupta et al. | |
| 2019/0095789 A1 | 3/2019 | Stopic et al. | |
| 2019/0377819 A1 | 12/2019 | Filliben et al. | |
| 2019/0391901 A1 | 12/2019 | Gupta et al. | |
| 2020/0065813 A1 | 2/2020 | Walters et al. | |
| 2020/0175380 A1* | 6/2020 | Sturlaugson | G06F 11/0739 |
| 2020/0210856 A1* | 7/2020 | Vengalayapalli Kichagari | G06Q 40/03 |
| 2021/0307621 A1 | 10/2021 | Svenson et al. | |

OTHER PUBLICATIONS

Van Vlasselaer V, Bravo C, Caelen O, Eliassi-Rad T, Akoglu L, Snoeck M, Baesens B. APATE: A novel approach for automated credit card transaction fraud detection using network-based extensions. Decision support systems. Jul. 1, 2015;75:38-48. (Year: 2015).*

Dorronsoro JR, Ginel F, Sgnchez C, Cruz CS. Neural fraud detection in credit card operations. IEEE transactions on neural networks. Jul. 1997;8(4):827-34. (Year: 1997).*

U.S. Appl. No. 17/283,005 , "Advisory Action", Mar. 9, 2022, 5 pages.

U.S. Appl. No. 17/283,005 , "Final Office Action", Feb. 25, 2022, 52 pages.

U.S. Appl. No. 17/283,005 , "Non-Final Office Action", Oct. 25, 2021, 34 pages.

U.S. Appl. No. 17/283,005 , "Notice of Allowance", Feb. 16, 2023, 10 pages.

CN201880098391.1 , "Notice of Decision to Grant", Aug. 11, 2021, 6 pages.

PCT/US2018/055039 , "International Preliminary Report on Patentability", Apr. 22, 2021, 6 pages.

PCT/US2018/055039 , "International Search Report and Written Opinion", Jul. 9, 2019, 9 pages.

SG11202103432V , "Written Opinion", May 18, 2022, 7 pages.

* cited by examiner

SYSTEM FOR DESIGNING AND VALIDATING FINE GRAINED FRAUD DETECTION RULES

CROSS-REFERENCE TO RELATED APPLICATIONS

This application of a Continuation Application of U.S. patent application Ser. No. 17/283,005, filed Apr. 5, 2021, which is a National Stage of International Application No. PCT/US2018/055039, filed Oct. 9, 2018, which are herein incorporated by reference their entirety for all purposes.

BACKGROUND

Data security is a continuing concern when interactions (e.g., transactions) between users and resource providers are conducted. While conventional methods for preventing unauthorized interactions from taking place exist, such systems could be improved. For example, while some conventional systems do a good job capturing unauthorized transactions from taking place by having strong security rules, strong security can also result in unnecessary transaction declines. This can be a problem when the user wishes to access secure data, access secure locations, or conduct payment transactions.

Embodiments of the invention address these and other problems, individually and collectively.

SUMMARY

One embodiment includes a method comprising: receiving, by a computer, historical interaction data, wherein the historical interaction data includes a plurality of historical interactions, each historical interaction associated with a plurality of data fields, the data fields being interdependent; assigning, by the computer, a plurality of weights to the plurality of data fields; generating, by the computer, a neural network using the plurality of weights and the plurality of data fields; identifying, by the computer, using the neural network, a first plurality of feature indicators indicative of a first class, the first class being different from a second class; receiving, by the computer, a second plurality of feature indicators derived from data relating to compromised accounts; updating, a probability distribution component in the computer using the first plurality of feature indicators and the second plurality of feature indicators; receiving, by the computer, current data for an interaction, applying, by the computer, the probability distribution component to the current data; and scoring, by the computer, the interaction using the probability distribution component.

Another embodiment includes a server computer comprising: a processor; and a computer readable medium, the computer readable medium comprising code, executable by the processor, for implementing a method comprising: receiving historical interaction data, wherein the historical interaction data includes a plurality of historical interactions, each historical interaction associated with a plurality of data fields, the data fields being interdependent; assigning a plurality of weights to the plurality of data fields; generating a neural network using the plurality of weights and the plurality of data fields; identifying using the neural network, a first plurality of feature indicators indicative of a first class, the first class being different from a second class; receiving a second plurality of feature indicators derived from data relating to compromised accounts; updating, a probability distribution component in the computer using the first plurality of feature indicators and the second plurality of feature indicators; receiving current data for an interaction; applying the probability distribution component to the current data; and scoring the interaction using the probability distribution component These and other embodiments are described in further detail below.

DETAILED DESCRIPTION

Figure 1:
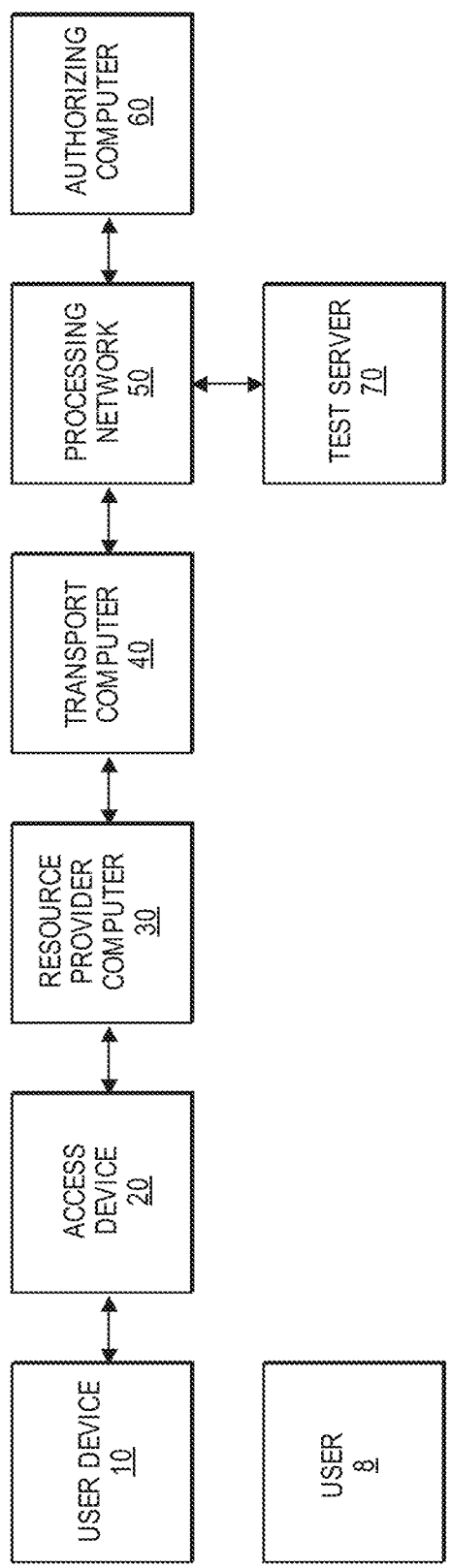
FIG. 1 shows a block diagram of a system according to an embodiment of the invention.

Discussions of some terms may be useful in embodiments of the invention.

A "user device" may be any suitable device that can interact with a user device (e.g., a payment card or mobile phone). User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "application" may be a computer program that is used for a specific purpose.

"Authentication data" may include any data suitable for authenticating a user or mobile device. Authentication data may be obtained from a user or a device that is operated by the user. Examples of authentication data obtained from a user may include PINs (personal identification numbers), biometric data, passwords, etc. Examples of authentication data that may be obtained from a device may include device serial numbers, hardware secure element identifiers, device fingerprints, phone numbers, IMEI numbers, etc.

"Access data" may include any suitable data that can be used to access a resource or create data that can access a resource. In some embodiments, access data may be account information for a payment account. Account information may include a PAN (primary account number), payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access request" may include a request for access to a resource. The resource may be a physical resource (e.g., good), digital resources (e.g., electronic document, electronic data, etc.), or services. In some cases, an access request may be submitted by transmission of an access request message that includes access request data. Typically a device associated with a requestor may transmit the access request message to a device associated with a resource provider.

"Access request data" may include any information surrounding or related to an access request. Access request data may include access data. Access request data may include information useful for processing and/or verifying the access request. For example, access request data may include details associated with entities (e.g., resource provider computer, processor server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "service provider" may be an entity that can provide a resource such as goods, services, information, and/or access typically through a service provider computer. Examples of a service provider includes merchants, digital wallets, payment processors, etc.

A "user" may include an individual or a computational device. In some embodiments, a user may be associated with one or more personal accounts and/or mobile devices. In some embodiments, the user may be a cardholder, account holder, or consumer.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

"Criteria" may include information used to determine one or more pieces of historical data. In some embodiments, criteria may include an age, a size, a date range, an amount, a location, an issuer, or any other suitable attribute of a set of data. For example, criteria may specify that transactions occurring in the last 24 hours be retrieved. Criteria may be combined in some embodiments to develop a rule including multiple criteria, such as, for example, Jan. 1, 2018-Mar. 1, 2018, over $500, and outside of the United States.

"Historical interaction data" may include any data or information regarding interactions that was previously collected and stored in a database or other suitable storage medium. Historical interaction data may include any suitable number of data files.

A "data file" may include a collection or set of one or more fields, together forming a record. Exemplary historical data may include historical transaction data files, including transaction amount and other fields, as well as a transaction outcome or determination (e.g., accepted, rejected as fraudulent, on hold, reported as fraudulent, etc.).

A "rule file" may include a grouping of rules. In some embodiments, the rule file may indicate a group of rules which are defined by the same party. For example, a rule file to be validated on a set of transactions may be defined by an issuer. In some embodiments, rule files may also be used to group rules with some logical or hierarchical association. In some embodiments, a rule file may contain any suitable number of rules.

A "server computer" may include a powerful computer or cluster of computers. For example, a server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "data field" can be a location where data is stored. Data fields can exist in messages such as authorization request messages requesting authorization for certain interactions (e.g., transactions). Data fields may also have values in them. Examples of data fields include fields for storing data such as user or device identifiers, transaction amounts, security data such as PIN codes, resource provider identifiers (e.g., merchant identifiers), etc.

A "class" may be a set or category of things having some property or attribute in common and differentiated from others by kind, type, or quality. An example of a first class might be "fraud" while another second class might be "no fraud." Other examples of classes might include "sensitive" and "non-sensitive.

A "neural network" "or "artificial neural network," can be a computer system that is modeled upon the human brain. An ANN is based on a collection of connected units or nodes called artificial neurons which loosely model the neurons in a biological brain. Each connection, like the synapses in a biological brain, can transmit a signal from one artificial neuron to another. An artificial neuron that receives a signal can process it and then signal additional artificial neurons connected to it.

In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

An "offline neural network" may include a neural network that is trained from offline data. "Offline data" may include data that is not associated with a current interaction, and may be based upon interactions of a current user, and also other users. In some embodiments, data that is used to train an offline neural network may be batch loaded to a historical interaction database (e.g., a historical transaction database).

An "online neural network" may include a neural network that is trained using at least online data. "Online data" may include data that has not yet been loaded to a historical interaction database, and is associated with interactions occurring with a certain time period (e.g., an hour) of a current interaction.

A "compromised account" may include an account that has been accessed by an unauthorized entity, such as by hacking or man-in-the-middle attacks. Data relating to a compromised account can include data such as account numbers, expiration dates, PIN codes, user identifiers, social security numbers, usernames, biometrics, and the like. Such data is typically considered sensitive and is not widely available to the public.

An "interaction" may include a reciprocal action or influence. A transaction between two parties, such as between a consumer and a merchant may be an example of an interaction. Other interactions may include users' use of specific data or content within certain locales.

"Current data" for an interaction may include data that is associated with a specific interaction. For example, if an interaction is a specific payment transaction, then current data associated with that specific payment transaction may include a transaction amount, a primary account number or token that is used to conduct the current interaction, a merchant identifier for the merchant that is interacting with the user, etc. Current data associated with a transaction to access secure data might include a device ID of the device that is being used, the date of access, the time of access, and the geographic location of the device being used to access the secure data.

A "feature indicator" may include a variable that has been identified as being useful in a model to predict an outcome based upon inputs. Feature indicators may be identified from analytical models such as neural networks. For example, a neural network may have identified a specific transaction amount range and a specific merchant ID as being highly correlative to fraud. The specific transaction amount range and the specific merchant ID may be considered examples of feature indicators.

FIG. 1 shows a block diagram of a transaction processing system according to an embodiment. FIG. 1 shows a user 8 that can operate a user device 10. The user 8 may use the user device 10 to pay for a good or service at a resource provider such as a merchant. The merchant may operate a resource provider computer 30 and/or an access device 20. The merchant may communicate with an authorizing computer 60 operated by an issuer, via a transport computer 40 operated by an acquirer and a processing network 50 such a payment processing network. A test server 70 may be in communication with a processing network, or may be present within the processing network 50.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a user device 10 at an access device 20 (e.g., POS location) can be described as follows. A user 8 presents his or her user device 10 to an access device 20 to pay for an item or service. The user device 10 and the access device 20 interact such that access data from the user device 10 (e.g., PAN, a payment token, verification value(s), expiration date, etc.) is received by the access device 20 (e.g., via contact or contactless interface). The resource provider computer 30 may then receive this information from the access device 20 via an external communication interface. The resource provider computer 30 may then generate an authorization request message that includes the information received from the access device 20 (i.e. information corresponding to the user device 10) along with additional transaction information (e.g., a transaction amount, merchant specific information, etc.) and electronically transmits this information to a transport computer 40. The transport computer 40 may then receive, process, and forward the authorization request message to a processing network 50 for authorization.

The processing network 50 may forward the authorization request message or the data in the authorization request message to the test server 70. The test server 70 can evaluate the data in the authorization request message using a model and may generate a score. The score may be a fraud score, which indicates a likelihood that the transaction that is being conducted is fraudulent. If the fraud score exceeds a threshold, then the transaction may be rejected. If the fraud score does not exceed the threshold, then the transaction may continue or may be approved. In some embodiments, the authorization request message may be modified to include the score. The authorization request message may then be forwarded to the authorizing computer 50. Further details regarding exemplary test servers as well as process performed by the test servers are described in further detail below.

In general, prior to the occurrence of a payment transaction, the processing network 50 has an established protocol with each issuer as to how the issuer's transactions are to be authorized. In some cases, such as when the transaction amount is below a threshold value, the processing network 50 may be configured to authorize the transaction based on information that it has about the user's account without generating and transmitting an authorization request message to the authorization computer 60. In other cases, such as when the transaction amount is above a threshold value, the processing network 50 may receive the authorization request message, determine the issuer associated with the user device 10, and forward the authorization request message for the transaction to the authorization computer 60 for verification and authorization. Once the transaction is authorized, the authorization computer 60 may generate an authorization response message (that may include an authorization code indicating the transaction is approved or declined) and transmit this electronic message via its external communication interface to processing network 50. The processing network 50 may then forward the authorization response message to the transport computer 40, which in turn may then transmit the electronic message to comprising the authorization indication to the resource provider computer 30, and then to the access device 20.

If the access data is in the form of a token, then the processing network 50 may exchange the token for a real credential (e.g., a PAN). Any authorization request message may then be modified to include the real credential and it may be forward to the authorization computer 60 for verification. The authorization computer 60 can generate an authorization response message with an approval or decline. The authorization response message can be transmitted to the processing network 50, and the processing network 50 may replace the credential with the token. The processing network 50 may then transmit the authorization response message back to the access device 20.

At the end of the day or at some other suitable time interval, a clearing and settlement process between the resource computer 30, the transport computer 40, the processing network 50, and the authorization computer 60 may be performed on the transaction.

Embodiments can include the creation of scores, based upon at least historical training data as well as data from compromised accounts, that can be used to determine if transactions should or should not proceed. In some embodiments, a test server containing the historical training data can receive data associated with compromised accounts from a compromise analyst management platform to generate a model that can accurately evaluate whether transactions should be classified in a first class (e.g., fraud) or a second class (e.g., not fraud).

In such embodiments, the test server may also be used by issuers to more accurately evaluate fraud rules that may be proposed by authorizing entities such as issuers. In addition to creating scores, the test server can allow authorizing entities such as issuers to create customized rules that help to separate legitimate transactions from fraudulent or potentially fraudulent transactions.

Some embodiments of the invention can use "transaction profiling." Transaction profiling can be performed based on rules defined by the authorizing entities such as issuers. In embodiments of the invention, multiple decision criteria can be embedded in a single rule. In embodiments, authorizing entities such as issuers can test the validity or effectiveness of their proposed, customized rules against historical transaction data. After validating effectiveness of a set of rules, an authorizing entity such as an issuer can "publish" the rules in the test server platform. The published rule set can be evaluated against all the subsequent transactions for an account range specified by the issuer in real-time.

The test server can allow authorizing entities such as issuers to specify ranges of account numbers, against which a proposed rule set can be applied. It would be more desirable if authorizing entities could apply a rule to a specific account. Thus, in some embodiments, test server can also use information about compromised accounts in its evaluations of whether or not transactions can proceed.

Embodiments may also include or utilize use a compromise analyst management platform or "CAMs" platform, which allows entities such as issuers, acquirers and merchants to provide notifications about accounts that were involved in a potential compromise. Issuers, for example, can provide details on exactly which feature indicators of a payment or card account (e.g., PIN, CVV, and cardholder personal information, etc.) were compromised. After the compromise analyst management platform receives and processes this information, it notifies impacted issuers via an alert notification.

Embodiments include a new architecture which can allow for transaction profiling at an individual account level in addition to an existing account range level, minimizing denial of genuine transactions and false positives, implementing a notion of a fraud probability score that allows issuers to design rules to minimize the denial of genuine transactions and to more precisely capture fraudulent transactions, and improving fraud detection.

Embodiments can include systems and methods that can provide for a number of advantages. First, embodiments can provide a platform for authorizing entities such as issuers to customize rules based on the risk associated at an individual account or account range level. Currently, the rules are designed for an account range without any knowledge of risk associated with the accounts in that range. Second, embodiments can provide for an estimate of effectiveness of a rule against current fraud trending methods. Third, embodiments can provide for a predictive probability of success ratio of a rule stopping the current fraud and approving legitimate transactions. Fourth, embodiments can provide suggestions to authorizing entities such as issuers at the time of creating rules based on the compromised accounts, which may be involved in a potential fraud activity.

Embodiments of the invention can evaluate data in authorization request messages to determine if a transaction should be approved or declined. Table 1 below shows examples of some fields and their values that are present in a typical transaction authorization request.

TABLE 1

| Field | Example Value |
| --- | --- |
| Account Number | BETWEEN 433430000XXXXXXX and 433439999 XXXXXXX |
| TransDate | 20171213 |
| TransAmount | 462.86 (USD) |
| Merchant Name | XYZ DEPARTMENT STORE |
| Card Acceptor ID | 4445090931071 |
| Merchant Country | UNITED STATES OF AMERICA |
| Merchant State | CALIFORNIA |
| Merchant City | LOS ANGELES |
| Merchant ZIP Code | 90036 |
| Network ID | 0002 |
| Merchant Category Code | 5311 |
| Acquiring Institution ID | 456834 |

Figure 2:
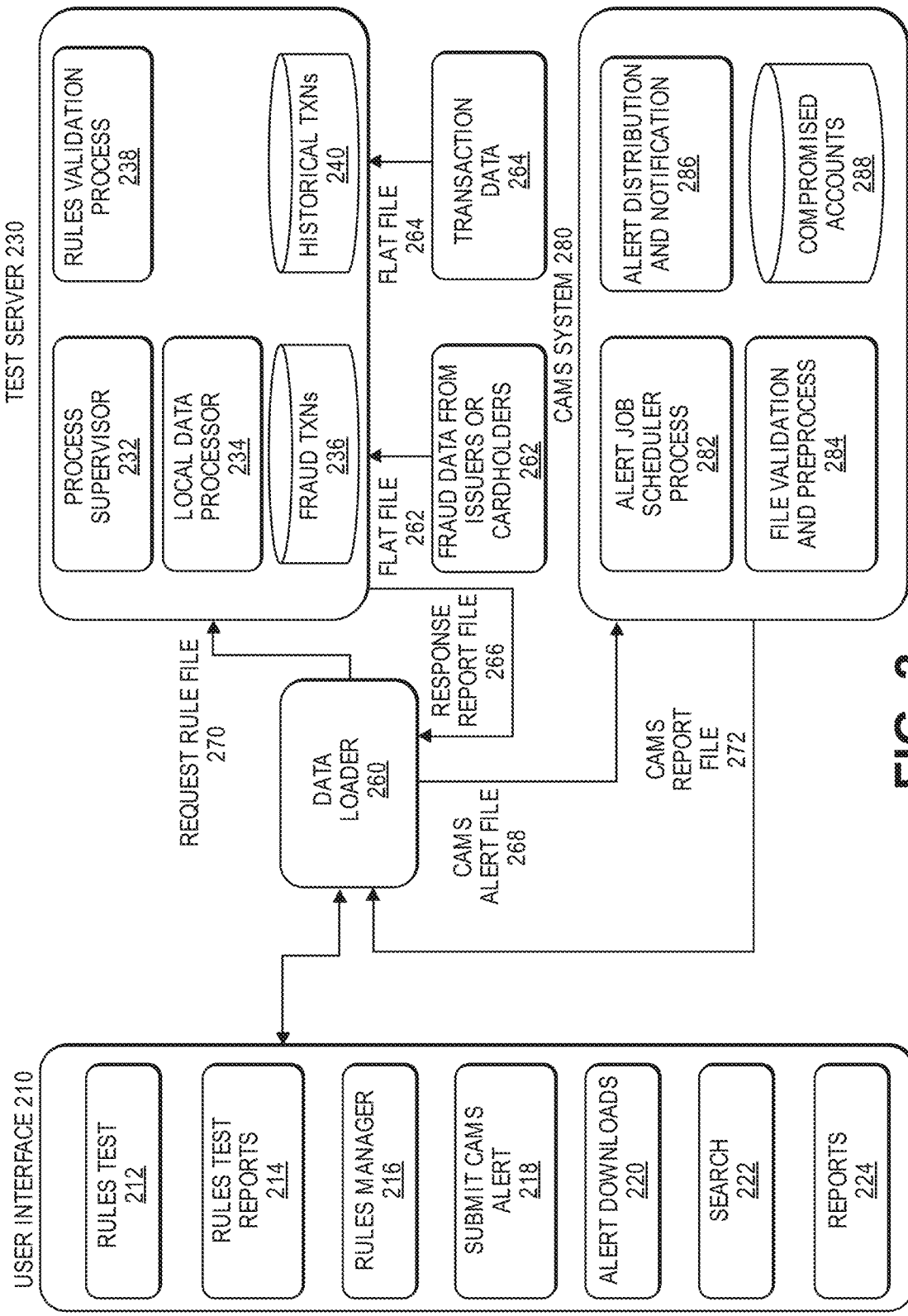
FIG. 2 shows a system illustrating a rule validation architecture according to an embodiment of the invention.

In embodiments, fraud detection rules can be created using the combination of various fields in the transaction. For example, a fraud-identifying rule can have the simple criterion such as: "If the Merchant Name is 'ABC Fraud Company' decline the transaction." As shown below, complex rules can be written, such as: "For a given account number, if more than three transactions occur within 30 minutes, an aggregate transaction amount is greater than 1000 USD, and the merchant location is not in USA, then flag the transaction as being potentially fraudulent." Such a rule may be expressed as follows for a given account number:

Fraud Criteria: $(\int_{dt=t-30}^{dt=t} \text{TransAmt}(dt)) > 1000$ USD
&& MerchCountry< >USA FIG. 2 shows an example of a system according to an embodiment. The system in FIG. 2 can be used to illustrate how a test server according to embodiments can obtain the data needed to score transactions.

The system may include a user interface 210 (which may be part of a client computer, which may comprise a processor, and a computer readable medium and a network interface coupled to the processor) in operative communication with a data loader 260. The data loader 260 may be software residing on a computer, which may be in communication with and can coordinate the transfer of data between the user interface 210, the test server 230, and a compromise analyst management system 280 (CAMs system).

In FIG. 2, an issuer can connect to the test server 230 through the user interface 210. An issuer representative (i.e., a user) can create rules using a rules manager 216, and can submit a set of rules for validation using a rules test module 212. The results of rules validation process are made available to the user by a rules test reports module 214.

The issuer representative can connect to the compromise analyst management system 280 through the user interface 210. The issuer representative can submit an alert file containing compromised accounts 268 using a submit CAMS alert module 218. The compromised accounts can be filtered, processed, and made available to the users through an alert downloads module 220, a reports module 224, and a search module 222.

The user interface 210 communicates with the test server 230 using the data loader 260. The data loader 260 submits a user requested rule file 270 to the test server 230 and receives a response report file 266 from the test server 230.

Fraud data can be submitted by issuers and cardholders in the form of a flat file 262 through an independent process. A flat file may be a file that can contain data. The fraud data can be stored in a fraud transactions database 236.

The transaction data from a payment processing network (e.g., VisaNet) is obtained by an independent process. This data is also in the form of flat file 264 and it is stored in a historical transactions database 240.

The test server 230 can include at least three components and two databases. The at least three components may include a process supervisor 232, a local data processor 234, and a rules validation process module 238. The process supervisor 232 coordinates various processes inside the test server 230. The local data processor 234 can be responsible for all of the in-memory data processing needs. The rules validation process module 238 can read fraudulent transactions from the fraudulent transactions database 236 and historical transaction data from the historical transactions database 240. The rules validation process module 238 performs the rules validation using the local data processor 234. The results of the rules validation process 238 can be stored back in fraudulent transactions database 236.

In some embodiments, an issuer submits the alert file containing either potentially or certainly compromised accounts to the compromise analyst management system 280. The issuer selects the level of compromise by selecting various pieces of compromised information and these pieces of information will be stored in the compromised accounts database 288 with relevant alert information.

The compromise analyst management system 280 picks the alert file submitted by the issuer and validates the records inside. This step removes incomplete and duplicate records.

The processed alert file 220 is broken down by the compromise analyst management system 280 backend alert distribution and notification process module 286 on per issuer basis. Other impacted issuers can be notified of the accounts that are compromised in the account ranges they are subscribed to. The alert file is made available to issuers for downloading the details of compromised accounts. The issuers can also search the details of a compromise event and view respective alert files. The issuers can also download reports that contain information about compromised accounts.

Figure 3:
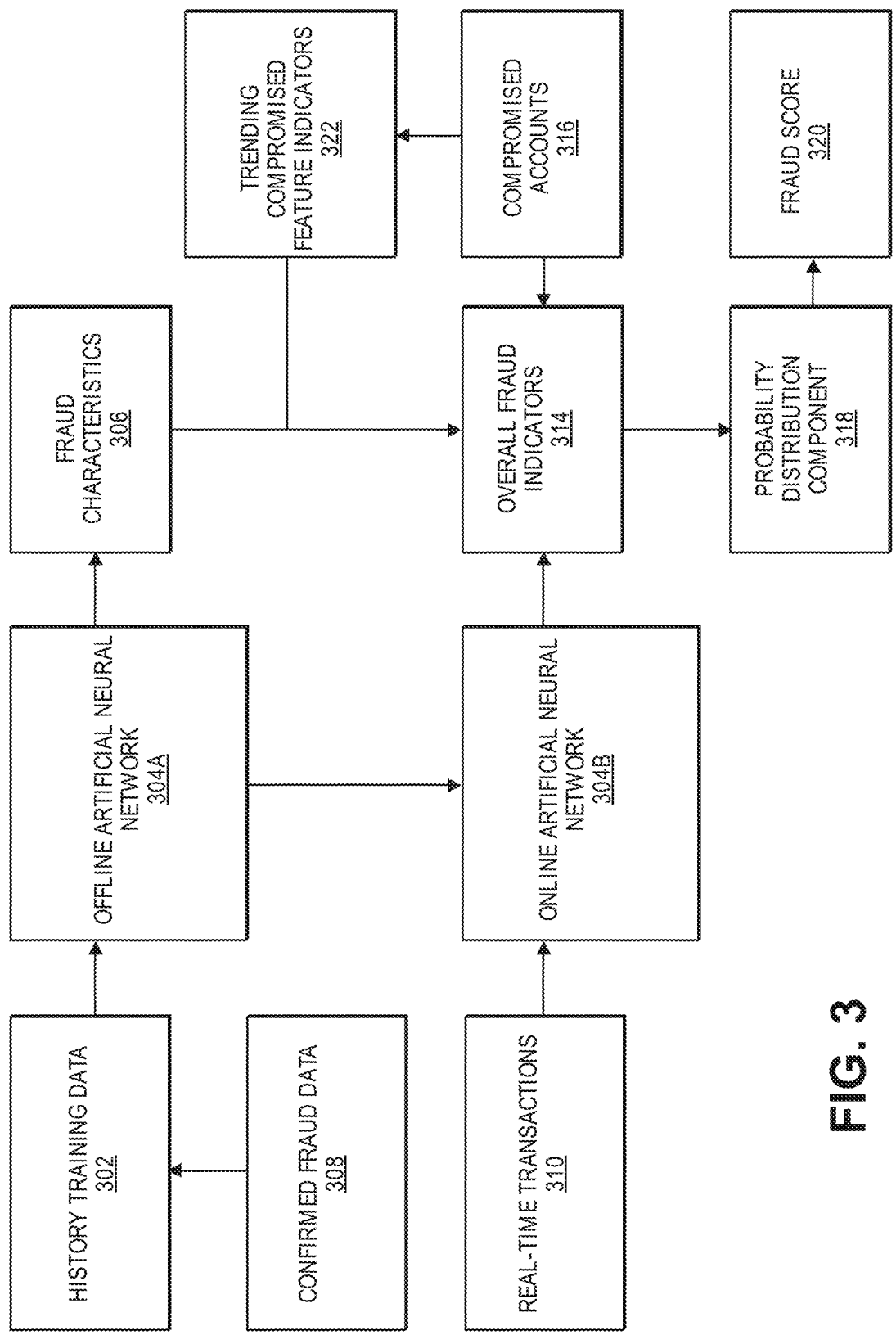
FIG. 3 shows a diagram of an artificial neural network fraud estimator.

FIG. 3 shows a data flow diagram illustrating an embodiment. The embodiment can be characterized as an artificial neural network fraud estimator. The fraud estimator may be embodied as software on a test server.

As shown in FIG. 3, confirmed fraud data 308 can be added to historical interaction training data 302. The historical transaction training data (a specific type of historical interaction data 302) and the confirmed fraud data may be received by a computer. The historical transaction training data includes a plurality of historical transactions. Each historical transaction is associated with a plurality of data fields, the data fields being interdependent. Examples of data fields are provided above in Table 1.

The historical transaction training data may include data for a large number of transactions. Such transactions can be credit, debit, or prepaid card transactions. Outside of the payment context, such transactions may include data access transactions, location access transactions, etc. The transaction data in the historical transaction training data may include transactions that have been flagged (or classified) as fraudulent, not fraudulent, and not yet determined. Confirmed fraud data 308 may include data that has recently confirmed to have been fraudulent. Any suitable period of time may be used. For example, transaction data that has been confirmed fraudulent over the past day, week, or month may be added in confirmed fraud data 308.

Once the historical transaction training data are obtained, the historical interaction training data 302 is then input into an offline artificial neural network 304A. The offline neural network 304A can include code logic with tuned parameters.

In the formation of the offline neural network 304A, a computer may assign a plurality of weights to the plurality of data fields, and the computer may generate the offline neural network using the plurality of weights and the plurality of data fields. It is then possible to identify, by the computer, using the offline neural network 304A, a first plurality of feature indicators indicative of a first class such as "fraud," the first class being different from a second class such as "not fraud." Thus, certain fraud characteristics may be identified by the offline neural network 304A as being particularly indicative of fraud. These feature indicators, or fraud characteristics 306 in this example, may then be included in overall fraud indicators 314.

The method may also include receiving, by the computer, a second plurality of feature indicators derived from data relating to compromised accounts. For example, compromised accounts information 316 may be obtained from the previously described compromise analyst management system. From the compromised accounts information 316, compromised feature indicators such as merchant ID, CVV (card verification value), and PIN may be extracted. Compromised feature indicators may include data that may have been obtained in a data breach or other account compromise. For example, a merchant database may have been hacked by hackers, and the hackers may have stolen account data such as payment account numbers, CVVs, and PINs. Such data, along with the merchant identifier of the merchant that was hacked, may pose a higher risk of fraud if they are present in transaction data in an authorization request message. Such data may be characterized as being a second plurality of features indicators. These feature indicators may be added to the overall fraud indicators 314.

Lastly, real time transaction data 310 may be fed to an online artificial neural network 304B. The online artificial neural network 304B may include code logic with tuned parameters 304B. Features indicative of fraud may be determined from the online artificial neural network 304B and may be collected with the overall fraud indicators 314. The identified features may be a third plurality of features. Data or features from the offline artificial neural network 304A can be provided to the online artificial neural network 304B to help train it in some cases.

The method may also include updating, a probability distribution component in the computer using the first plurality of features, the second plurality of features, and the third plurality of features. For example, once the overall fraud indicators are collected from the offline artificial neural network 304A, the online artificial neural network 304B, and compromised accounts 316, the collection of these may be considered using a probability distribution component 318.

The probability distribution component 318 may then produce a fraud score 320. The probability distribution component may be a software module residing on the previously described test server. The probability distribution component 318 may be a model that can be applied to current feature indicators in current data for a transaction. The probability distribution component 318 may use fraud characteristics 306 from the offline neural network 304A, data from the online neural network 304B, and data regarding compromised accounts 316 to build a fraud scoring model. A fraud score 320 may be output by the probability distribution component 318.

Illustratively, the probability distribution component may weigh the significances of data that is provided by the fraud characteristics 306 from the offline neural network 304A, data from the online neural network 304B, and data regarding compromised accounts 316 to build a fraud scoring model. In this example, the fraud characteristics 306 from the offline neural network 304A may indicate that for transactions less than $100 at merchant X using account number Y may be of "low risk." However, the data from the online neural network 304B may indicate that an unusual number of chargebacks have been occurring at merchant X, and data regarding compromised accounts 316 may indicate that account number Y was recently compromised at merchant Z. As a result of the data from the online neural network 304B and the data regarding compromised accounts 316, the score for the current transaction may be "high risk" instead of "low risk," as initially identified by the offline neural network 304A.

Figure 4:
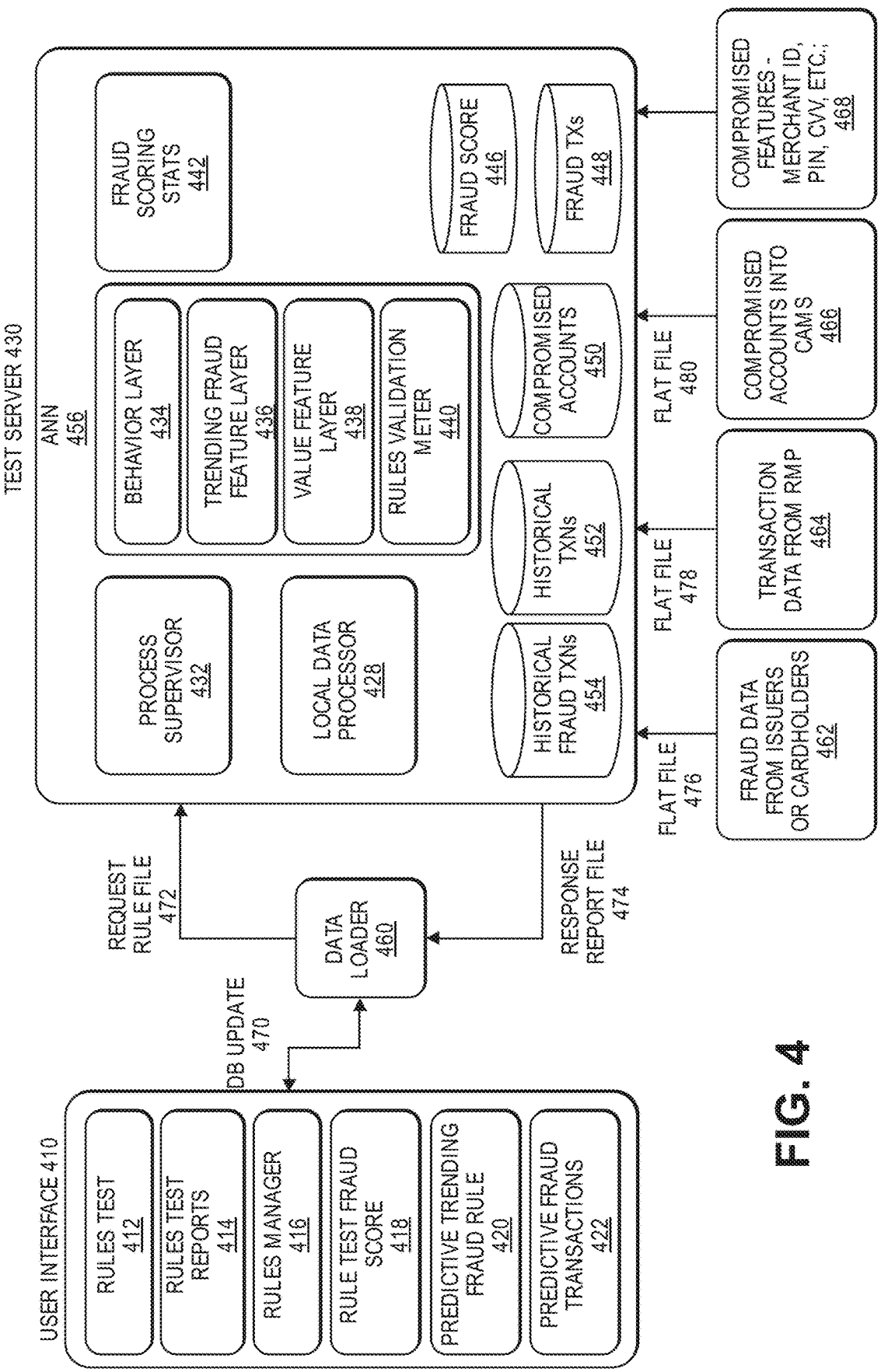
FIG. 4 shows a block diagram of another rule validation architecture according to an embodiment of the invention.

FIG. 4 shows a system according to some embodiments. The system in FIG. 4 has a more detailed breakdown of components in the test server 430. FIG. 4 shows a user interface 410, a data loader 460, and a test server 430 in operative communication with each other.

The user interface 410 can include a rules test module 412, a rules test reports module 414, and a rules manager 416. These components may be analogous to 212, 214, and 216 in FIG. 1, respectively. Also, in this particular implementation, embodiments add three new services to the user interface 410. They include a rule fraud score module 418, a predictive trending fraud rule module 420, and a predictive fraud transactions module 422.

The test server 430 in FIG. 4 includes a process supervisor 432, a local data processor 428, a fraudulent transactions database 448, and a historical transactions database 452, which may be analogous to 236 and 240 in FIG. 1. The test server 430 also includes a behavioral layer component 434, a trending fraud feature layer component 436, and a value feature layer 438, and a rules validation meter 440.

The behavioral layer 434 can include weights associates with each of the features in a model. The behavioral layer 434 may include behavioral profiles associated with account numbers.

The trending fraud feature layer 436 can include features and weights associated with current transaction data.

The value feature layer 438 may combine outputs from the behavioral layer 434 and the trending fraud layer 436 to identify potential fraudulent behavior.

The rules validation meter 440 may be used to validate rules that may be supplied via the user interface 410. Validation of any issuer supplied rules can be confirmed with data from the value feature layer 438 and data from the compromised accounts 450. For example, if a rule is submitted by an issuer which states that a transaction should be approved if it is more than $100 and is at merchant X. Data from the compromised accounts 450 may indicate that merchant X recently had a data breach and that the account number used for the transaction was stored at merchant X. This information may be used to validate the issuer's rule, or cause the issuer to change the rule. For instance, since the account number was compromised, the rule may be changed so that any transaction at merchant X should be declined if the transaction is more than $100.

The test server 430 can run a process that is responsible to provide all the information needed for the rules test module 412, the rules manager 418, the predictive trending fraud rule 420, and the predictive fraud transaction module 422 in the user interface 410. For fraud validation, the test server can include a fraud scoring database 448 and a fraudulent transactions database 448.

In the neural network component 456, features extracted from historical transaction data 452 are used to create an optimized decision tree or other suitable analytical model. The transaction data 452 can be used to generate neural network that gets stored in a database using weights as the value of n-variables. The data in the historical transactions database 452 can contain data in many different fields as shown above in Table 1. The interdependency of the variables is also taken into account while creating a decision tree. For example, if a valid transaction occurred at 2130 GMT with an amount X, and another valid transaction occurred with an amount Y at 2230 GMT, and both the transactions occurred at merchants in San Francisco. The weights of the merchant location in "San Francisco" can be adjusted to accommodate for these valid transactions. Likewise, different weights can be calculated for various merchant identifiers where multiple transactions took place over a defined time-period.

Embodiments can use a behavioral plane of account numbers with respect to time. A behavioral plane can be created based upon certain purchase patterns associated with account numbers over time. For example, a user may use an account number to make frequent purchases at electronic stores and coffee shops, while another user may make frequent purchases at grocery stores and gas stations. Each of these accounts numbers may have distinct behavioral planes. The various features of the transactions used to create the behavioral planes can be interdependent. If a current transaction occurs, then features from that transaction can be compared to the behavioral profile for that account to determine a standard deviation score. If the score exceeds a threshold, then this may be indicative of fraud. This information could be incorporated into the probability distribution component 318 and/or could be derived from the offline artificial neural network 304A in FIG. 3 as inputs to produce a fraud score 320. Such information may also be used to the test server 430 to produce the fraud score.

When a transaction occurs, various features can extracted from the transaction data and run against a current fraud model as described above in the probability distribution component (318 in FIG. 3). The weighted value of each feature can be compared against a set of current trending feature weights and the unweighted values are compared against each other to evaluate the closeness of weighted values against the fraud feature weights. The resulting score, which can be generated by the median values, can provide an insight of the validity of the transaction against both the user profile and fraud profile. One advantage of this comparison is that it eliminates false positives and creates accurate scores for fraudulent transactions.

Illustratively, a user profile can have weights in a simple behavioral plane for features as follows. For example, at time T1, a current neural network of account X has a transaction weight, Tw1, of 0.6 and Merchant ID weight, Mw1, of 0.2. At time T2, a transaction occurs and the transaction is conducted for a transaction amount of $500 at a merchant with a merchant ID 555. This information can be fed back into the neural network, and the transaction amount changes to a weight of 0.7 and the merchant ID changes to a weight, w2, of 0.8. The deviation in the weights with respect to the amount feature and Merchant ID feature in the neural network at time T1 and at time T2 can be outside of a predicted plane model and would result in a high-risk score.

The following examples would outline the typical scenarios: (1) a number of deviations of current transaction features from a normal behavioral plane; and (2) a number of closely matched weights with fraud features weights.

For the fraudulent transactions database 448, the account number in the transaction is checked against a repository (e.g., database 450) that holds potential and confirmed compromised accounts. In some embodiments, the neural network weights of a neural network such as an online or offline neural network can be adjusted for compromised accounts using back propagation to improve the sensitivity of the plane and to generate a higher risk score should the new transaction weights differently for certain compromised features such as PIN, CVV, expiration date, SSN (social security number), cardholder information and compromised merchant, etc.

Illustratively, the trained behavioral plane can have a weight 0.4 of n aggregated transaction amounts within a time period Tp at a merchant location (M) and the sigmoid value of the neuron-M (Sn) can be 0.58. Any new transaction for which a fraud assessment generates the adjusted weight to 0.5 on (n+1) aggregated transaction amounts within time-period T(p+1), and the transaction has occurred at location X, which was a known compromised merchant, and this generates a sigmoid value (Sn+1) of 0.64 for M.

The feed-forward score of the potential compromised account could be calculated by the function as follows.

The sigmoid value of compromised neuron=Input Values (x)*Weights(x)*fraud weight of the neuron. Here, the fraud weight of the neuron is calculated by another analytical mode (e.g., another desicion tree), which continuously updates the weights of the neurons by ever changing fraud techniques data, which is coming to the compromised analysis management system from various sources (e.g., payment processors, issuers, users, etc.).

The neural network logic uses various activation functions from the input layer to output layer to adjust the corresponding weights in the branches and are not limited by the functions discussed in this document. In addition, these functions are continuously updated with newer activation functions that provide more accurate outputs run from Random Forests.

Any suitable type of activation function can be used in embodiments.

The following can be an exemplary sigmoid activation function:

Initial Output Feature Neuron Weight
$Ofw = \Sigma_{i=0}^{i=n} OutputValue[Feature[i]] * InputValue$ of Feature]

Final Output Neuron Weight $Ofw = 1/(1+e^{-Ofw})$

The following can be an exemplary Tan H activation function.

Initial Hidden Weight of Feature Neuron $Hfw = Hfw + \Sigma_{i=0}^{i=n} OutputValue[Feature[i]] * InputValue$ of Feature]

Final Output Neuron Weight $Hfw = (e^{Hfw} - e^{-Hfw})/(e^{Hfw} + e^{-Hfw})$

The scoring statistics module 442 enables various features. For example, with respect to a fraud score, issuers presently have no idea on how many fraudulent transactions can be captured by a given rule. Using embodiments, a payment processor may provide issuers information on: the percentage of fraudulent transactions that are captured by the rule, the number of legitimate transactions that may get declined by the rule, and the effectiveness score of the rule against fraud.

With respect to trending fraud rules, embodiments may be able to suggest rules that can capture more accurate fraudulent transactions based on the account ranges and may provide a behavioral profile of those account ranges.

With respect to fraudulent transactions, embodiments may be able to provide insight of the effectiveness of the issuer created rules by generating reports of suspected fraudulent transactions that were captured and the legitimate transactions that have low risk score that can be declined by the rule. This allows issuers to improve their rules that target the fraud more accurately.

Figure 5:
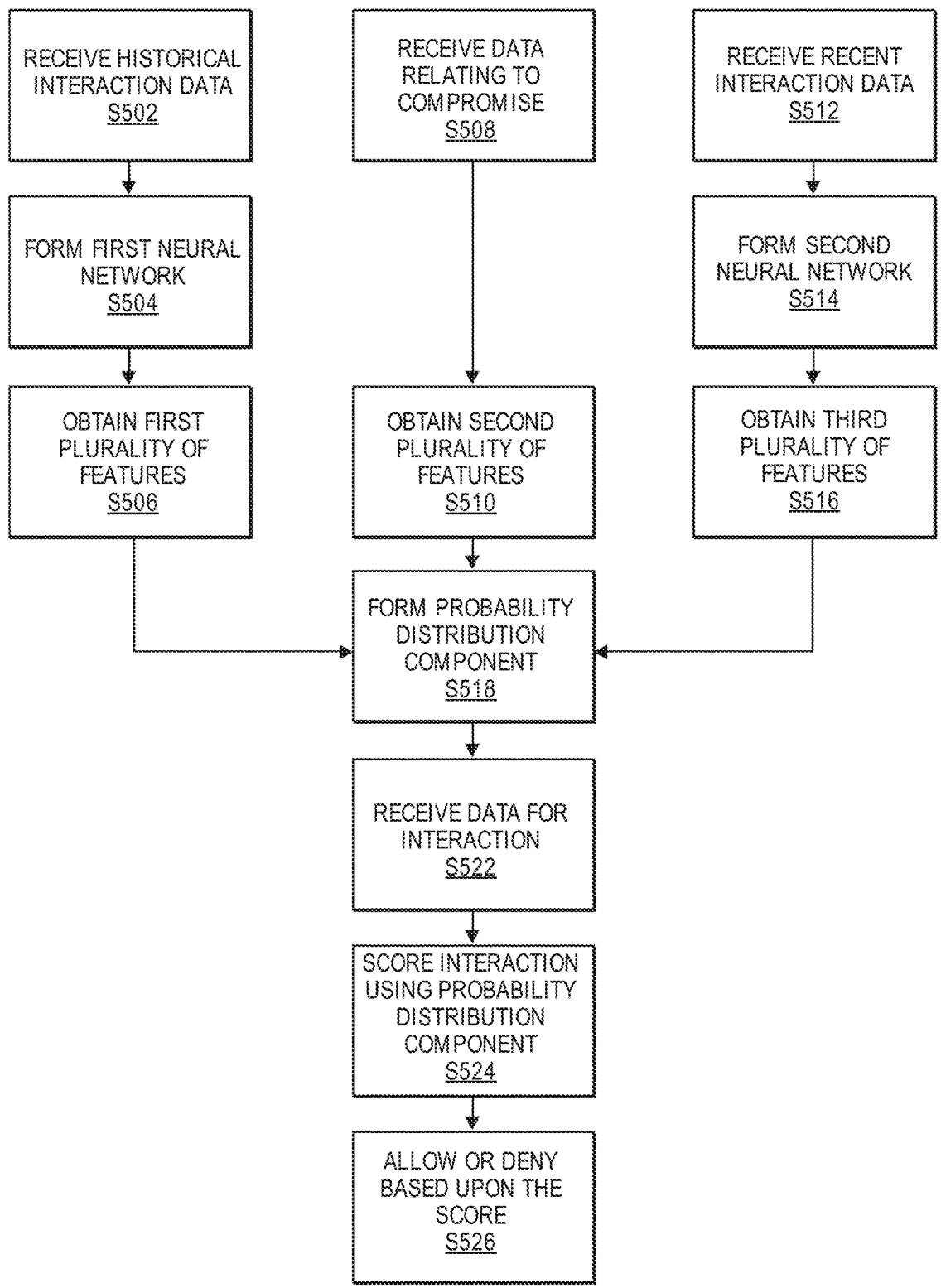
FIG. 5 shows a flowchart illustrating an embodiment.

FIG. 5 shows a flowchart illustrating a method according to an embodiments of the invention.

At step S502, the method may include receiving, by a computer, historical interaction data, wherein the historical interaction data includes a plurality of historical interactions, each historical interaction associated with a plurality of data fields, the data fields being interdependent. The computer also assigns a plurality of weights to the plurality of data fields, and then at step S504, generates (e.g., trains) a neural network using the plurality of weights and the plurality of data fields.

At step S506, the computer identifies or otherwise obtains using the neural network, a first plurality of feature indicators indicative of a first class, the first class being different from a second class. For example, the first class may be labeled "fraud" while the second class may be labeled "not fraud." Feature indicators that may have been identified by the neural network as differentiating interactions as being fraudulent or not fraudulent may include a specific merchant ID and a specific transaction amount range.

At step S508, the computer receives a second plurality of feature indicators derived from data relating to compromised accounts, and a second plurality of features may be obtained in step S510. For example, comprised accounts may include accounts that were in a merchant database that was hacked by hackers. The account numbers and PIN numbers associated with those account numbers may have been stolen. Data relating to compromised accounts may include the account numbers and PINs.

At step S512, the computer receives recent interaction data, wherein the recent interaction data includes a plurality of recent interactions, each recent interaction associated with a second plurality of data fields, the data fields being interdependent. The plurality of recent interactions may be a plurality of recent payment transactions. The interaction data for those recent payment transactions may include data including transaction amounts, account numbers, resource provider identifiers, approvals, declines, chargebacks, reversals, and the like.

At step S514, the computer generates a second neural network using a second plurality of weights and the second plurality of fields associated with the recent interaction data.

At step S516, the computer identifies using the second neural network, a third plurality of feature indicators indicative of the first class. For example, the third plurality of feature indicators may indicate that features such as specific resource provider identifiers associated with resource providers, and an abnormal number of declines or chargebacks at those resource providers may be examples of feature indicators.

At step S518, the computer updates a probability distribution component in the computer using the first plurality of feature indicators, the second plurality of feature indicators, and the third plurality of feature indicators. At this point, the probability distribution component may form a model that can be used to score interactions.

At step S522, current data for an interaction may be received by the computer The interaction may be a transaction that is conducted by a user with a resource provider. More specifically, the interaction may be a credit or debit card transaction conducted with a merchant. The current data may be data that is present in an authorization request message. Such data may include an account number, transaction amount, merchant ID, transaction location, and the like.

At step S524, the current interaction may be scored. The interaction may be scored by the previously described probability distribution component 318 in FIG. 3. The first, second, and third plurality of feature indicators may be appropriately weighed in order to arrive at a score for the current interaction.

At step S526, the current interaction may be approved or denied depending upon the score. For example, the interaction may be denied if the score is above a threshold, and approved if the score is below the threshold. The threshold may be any suitable threshold according to any suitable scale. For example, the scale may be 100, and a score over 75 may indicate "fraud," while a score below or equal to 75 would indicate "not fraud."

Note that the score can be used to approve or decline transactions, or may be information that can be used for other purposes. For example, the score can be sent to an issuer so that the issuer can validate a proposed rule. For instance, a rule may be proposed by an issuer, and that rule may be applied to a set of transactions. The set of transactions can also be scored according to embodiments, and those scores can be compared against the classification of the transactions by the issuer proposed rule. In this way, the issuer's proposed rule's effectiveness can be evaluated.

Figure 6:
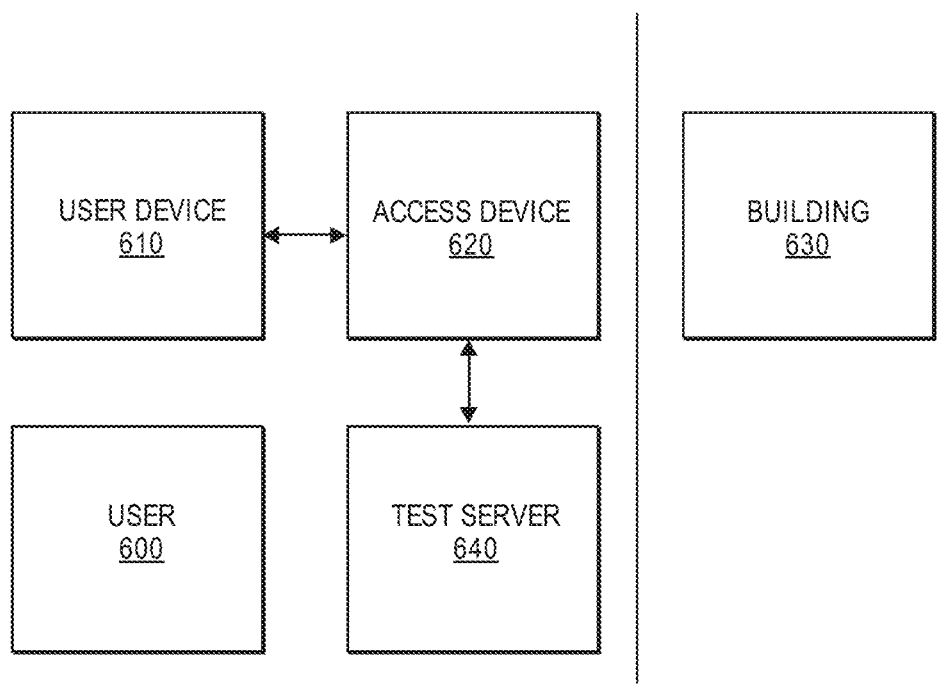
FIG. 6 shows a block diagram of an access system according to an embodiment.

FIG. 6 shows a block diagram of a building access system. FIG. 6 shows a user device 610 operated by a user 600. The user device 610 has been provisioned with access data as described above. The mobile device 610 can interact with the access device 620 and pass access data to the access device 620. The access device 620 may provide the access data to the test server 640 to verify the received access data and calculate a score based upon historical interaction data, recent interaction data, and data relating to compromised accounts. The test server 640 may then decide if the user 600 should be allowed to enter the building 630 based upon a determination of whether the score exceeds a threshold. The test server 640 may transmit a signal indicating this back to the access device 620. The access device 620 may then proceed to let the user 600 enter the building 630.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
providing, by a client computer to a server computer, current data for a current interaction, wherein the server computer is programmed to:
receive historical interaction data, wherein the historical interaction data includes a plurality of historical interactions, each historical interaction associated with a first plurality of data fields, the data fields being interdependent,
assign a first plurality of weights to the first plurality of data fields,
generate a first neural network using the first plurality of weights and the first plurality of data fields, the first neural network being an offline neural network trained using the plurality of historical interactions,
identify using the first neural network, a first plurality of feature indicators indicative of a first class, the first class being different from a second class,
receive a second plurality of feature indicators derived from data relating to compromised accounts, the compromised accounts being accounts that have been accessed by unauthorized entities,
receive, recent interaction data, wherein the recent interaction data includes a plurality of recent interactions involving different account numbers conducted with a recent time period of the current interaction, the plurality of recent interactions separate from the plurality of historical interactions, each recent interaction associated with a second plurality of data fields, the data fields being interdependent,
generate a second neural network using a second plurality of weights and the second plurality of data fields associated with the recent interaction data, the second neural network being an online neural network trained using the recent interaction data,
identify, using the second neural network, a third plurality of feature indicators indicative of the first class, and
update a probability distribution component using the first plurality of feature indicators, the second plurality of feature indicators, and the third plurality of feature indicators, wherein the probability distribution component forms a model that scores interactions,
apply the probability distribution component to the current data, and
determine a score by scoring the current interaction using the probability distribution component; and
receiving, by the client computer from the server computer, a message based on the score.

2. The method of claim 1, wherein the second plurality of feature indicators include merchant identifiers, card verification values and PINs.

3. The method of claim 1, wherein the compromised accounts are accounts that were attacked by hackers.

4. The method of claim 1, wherein the historical interaction data comprises historical payment transaction data.

5. The method of claim 1, wherein the recent interaction data comprises recent payment transaction data.

6. The method of claim 1, wherein the server computer is further programmed to:
update the second neural network with the current data.

7. The method of claim 1, wherein the historical interaction data comprises is data associated with accessing secure data.

8. The method of claim 1, wherein the current data comprises a primary account number or a payment token.

9. The method of claim 1, wherein the first plurality of feature indicators, the second plurality of feature indicators, and the third plurality of feature indicators are variables useful in models used to product outputs based on inputs.

10. The method of claim 9, wherein the compromised accounts were accounts that were subjected to hacking attacks by unauthorized entities.

11. The method of claim 1, wherein the current data is received in an authorization request message from the client computer, the client computer being an access device operated by a resource provider.

12. The method of claim 11, further comprising:
declining access to a resource provided by the resource provider if the score exceeds a threshold.

13. The method of claim 12, wherein the server computer is further programmed to: if the score does not exceed the threshold, modify the authorization request message to include the score and transmit the modified authorization request message to an authorizing computer.

14. The method of claim 1, wherein the first neural network comprises sigmoid functions.

15. A system comprising:
a client computer comprising a first processor, and a first non-transitory computer readable medium comprising code, executable by the first processor to programmed to provide to a server computer, current data for a current interaction, and
receive a message based on a score from the server computer; and
the server computer in communication with the client computer, wherein the server computer comprises a second processor, and a second non-transitory computer readable medium comprising code, executable by the second processor is programmed to:
receive historical interaction data, wherein the historical interaction data includes a plurality of historical interactions, each historical interaction associated with a first plurality of data fields, the data fields being interdependent,
assign a first plurality of weights to the first plurality of data fields,
generate a first neural network using the first plurality of weights and the first plurality of data fields, the first neural network being an offline neural network trained using the plurality of historical interactions,
identify using the first neural network, a first plurality of feature indicators indicative of a first class, the first class being different from a second class,
receive a second plurality of feature indicators derived from data relating to compromised accounts, the compromised accounts being accounts that have been accessed by unauthorized entities,
receive, recent interaction data, wherein the recent interaction data includes a plurality of recent interactions involving different account numbers conducted with a recent time period of the current interaction, the plurality of recent interactions separate from the plurality of historical interactions, each recent interaction associated with a second plurality of data fields, the data fields being interdependent,
generate a second neural network using a second plurality of weights and the second plurality of data fields associated with the recent interaction data, the second neural network being an online neural network trained using the recent interaction data,
identify, using the second neural network, a third plurality of feature indicators indicative of the first class, and
update a probability distribution component using the first plurality of feature indicators, the second plurality of feature indicators, and the third plurality of feature indicators, wherein the probability distribution component forms a model that scores interactions,
apply the probability distribution component to the current data, and
determine the score by scoring the current interaction using the probability distribution component.

16. The system of claim 15, wherein the current data is received in an authorization request message, and wherein the client computer is an access device operated by a resource provider.

17. The system of claim 16, wherein the first non-transitory computer readable medium further comprises code executable by the first processor client computer is further programmed to:
decline access to a resource provided by the resource provider if the score exceeds a threshold.

18. The system of claim 17, wherein the second non-transitory computer readable medium further comprises code executable by the second processor server computer is further programmed to: if the score does not exceed the threshold, modify the authorization request message to include the score and transmitting the modified authorization request message to an authorizing computer.

19. The system of claim 15, wherein the first neural network comprises sigmoid functions.

20. The system of claim 15, wherein the model is a fraud model.

* * * * *